United States Patent
Holvoet et al.

(10) Patent No.: US 9,010,687 B2
(45) Date of Patent: Apr. 21, 2015

(54) INSULATING BLANKET FOR AN AIRCRAFT AND ASSEMBLY INTEGRATING SUCH A BLANKET

(75) Inventors: Julie Holvoet, Toulouse (FR); Pierre Charon, Toulouse (FR); Olivier Philippe, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 295 days.

(21) Appl. No.: 13/165,465

(22) Filed: Jun. 21, 2011

(65) Prior Publication Data
US 2012/0018580 A1    Jan. 26, 2012

(30) Foreign Application Priority Data

Jun. 22, 2010    (FR) .................................... 10 02612

(51) Int. Cl.
  *B64C 1/40*    (2006.01)
  *B64C 1/14*    (2006.01)
(52) U.S. Cl.
  CPC ............... *B64C 1/406* (2013.01); *B64C 1/1492* (2013.01)
(58) Field of Classification Search
  CPC .......... B64C 1/40; B64C 1/403; B60R 13/08; B61D 17/185; B62D 33/0604
  See application file for complete search history.

(56) References Cited

U.S. PATENT DOCUMENTS

| | | | | |
|---|---|---|---|---|
| 3,732,600 A | * | 5/1973 | Perina .............................. | 24/444 |
| 5,565,254 A | * | 10/1996 | Norvell ........................... | 428/71 |
| 5,779,193 A | * | 7/1998 | Sloan ......................... | 244/117 R |
| 6,007,026 A | * | 12/1999 | Shorey ........................ | 244/171.8 |
| 7,059,565 B2 | * | 6/2006 | Scown et al. .............. | 244/117 R |
| 2005/0082431 A1 | | 4/2005 | Scown et al. | |
| 2011/0309197 A1 | * | 12/2011 | Holvoet et al. ............... | 244/131 |

FOREIGN PATENT DOCUMENTS

| | | | |
|---|---|---|---|
| DE | 102011075774 A1 | * | 11/2012 |
| FR | 2898585 A1 | * | 9/2007 |
| FR | 2 936 219 A1 | | 3/2010 |
| WO | WO 2005/068290 A1 | | 7/2005 |

OTHER PUBLICATIONS

French Preliminary Search Report issued Feb. 14, 2011, in French 1002612, filed Jun. 22, 2010 (with English Translation of Category of Cited Documents).

\* cited by examiner

*Primary Examiner* — Brian M O'Hara
(74) *Attorney, Agent, or Firm* — Oblon, McClelland, Maier & Neustadt, L.L.P.

(57) ABSTRACT

This invention proposes an insulation blanket for an aircraft, the said blanket coming in the form of a strip of insulation material of elongated shape having two more or less parallel longitudinal edges (12).
This blanket comprises:
  at least one bar (14) extending over one face of the insulation blanket (6), from one longitudinal edge (12) to the other thereof, as well as
  means for holding (18) the said bar (14), and
  the bar (14) bears at least one system support intended to receive a system (30, 32).

Figure 1:
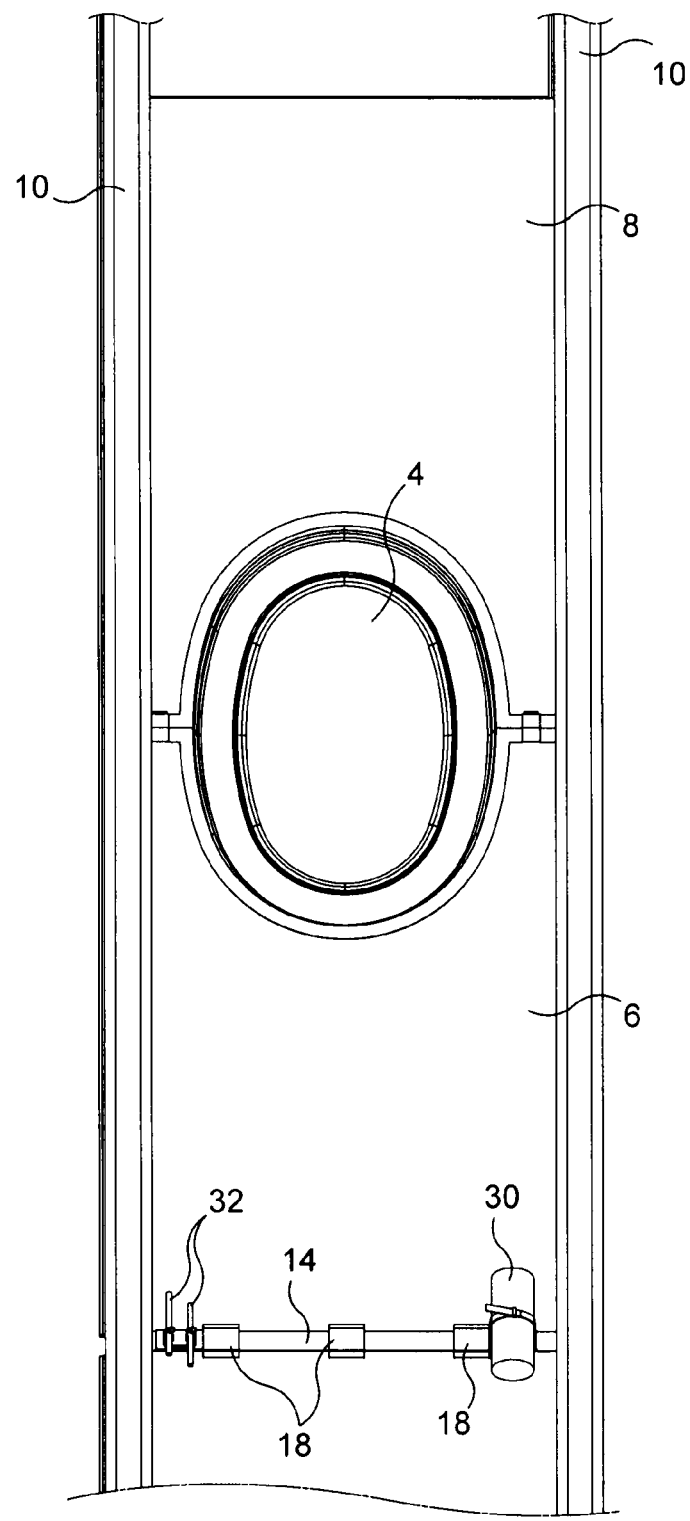

13 Claims, 6 Drawing Sheets ced shape having two more or less
INSULATING BLANKET FOR AN AIRCRAFT AND ASSEMBLY INTEGRATING SUCH A BLANKET This invention relates to an insulation blanket for an aircraft as well as to an assembly integrating such a blanket.

The structure of the fuselage of an aircraft usually is made up of frames extending in transverse planes, stringers extending more or less along a longitudinal direction of the aircraft outside the frames, and a skin that covers the said stringers and is fastened thereto. The skin also is fastened to the frames, through connecting parts known under the name of stabilizer or clip.

In the cabin in particular, the interior faces of the fuselage are covered successively by insulation blankets, producing a thermal and sound insulation of the cabin, and by covering panels the interior face of which remains visible from the cabin and thus forms a finish face. Between two successive frames of the fuselage, the skin of the said fuselage is covered by insulation blankets called field blankets. Each frame of the fuselage is further covered by a blanket called frame blanket. An overlap zone may be provided between consecutive frame and field blankets.

Between the insulation blankets and the covering panels, systems are arranged: equipment items, electric wirings, hydraulic and pneumatic systems, . . .

These systems usually are fastened to the structure of the fuselage by localized fastening devices traversing the insulation blankets covering the said structure. Thus, for example, the electric wirings are fastened to the frames of the fuselage with the aid of localized fastening devices comprising a rod which traverses the frame and the blanket (or blankets) which cover it, washers for locking the rod on both sides of the frame, and a lug into which there engages a quick-clamping collar receiving one or more wirings. As regards the pipes provided for the circulation of conditioned air, they usually are fastened to the stringers, with the aid of localized fastening devices comprising a clamping collar borne by a support fastened to a stringer by screws; these screws traverse the field blanket covering the stringer.

For fastening of the systems, it therefore is necessary to make holes in the structure of the fuselage as well as in the insulation blankets.

The holes made in the structure weaken the latter and therefore make it necessary to provide thickened zones or other structural reinforcements close to them. These holes therefore complicate the design of the fuselage.

Holes made in the insulation blankets degrade the insulation performances of the latter, creating as many thermal and acoustic bridges. They also reduce their watertightness (as it happens, the insulation blankets also have the function of draining, to the trough bottom of the fuselage, the water of condensation appearing on the skin of the latter). Moreover, the making of these holes considerably complicates the manufacture of the blankets and weights down the cost prices thereof. In fact, at each hole made in a blanket comprising a layer of glass wool, the said layer must be replaced by a foam rubber disk, which facilitates making of the hole and reinforces the blanket around the said hole so as to prevent the blanket from tearing.

Moreover, in the event of belated modification (when the aircraft is in assembly phase for example) of the structure of the fuselage or of a system, it is necessary to make one or more additional holes in the blanket concerned and/or in the structural element concerned.

The making of an additional hole in a blanket is a particularly long and tedious process. To this end, it is advisable, in fact, to bond an adhesive strip on each face of the blanket at the location of the hole, cut out a disk in the blanket at the location of the hole with the aid of a first specific cutting tool, remove the blanket disk cut out in this manner and replace it with a foam rubber disk, again bond an adhesive strip on each face of the blanket so as to cover and hold the foam rubber disk, pierce the blanket in the center of the foam rubber disk with the aid of a second specific cutting tool so as to form the hole. When an additional hole is made in a blanket, it furthermore is necessary to fill up the henceforth unused hole in the blanket.

The belated making of holes in a structural element also poses a problem. These holes weaken the structure and, because they are not provided for during design of the fuselage, often make it necessary to add structural reinforcements. Moreover, when the structure is of a composite material, the making of a hole requires the use of a specific tool, generates chips that are harmful—and therefore hazardous for the operator in charge of making the hole—and may cause delaminations of the composite material around the hole. These problems are more difficult to control when making of the hole is not provided for at the outset, and is not done at the manufacturing site of the structure.

For all the reasons indicated above, it is desirable to limit the number of holes made in the structure and in the blankets for fastening the systems.

The invention has as an objective to reduce the number of holes to be made, for purposes of fastening the systems, in the structure of the fuselage of an aircraft and in the insulation blankets that cover this structure. The invention also advantageously will make it possible to avoid having to make additional holes in the structure of the fuselage or in the insulation blankets in the event of belated modification of this structure or of certain systems.

For this purpose, this invention proposes an insulation blanket for an aircraft coming in the form of a strip of insulation material of elongated shape having two more or less parallel longitudinal edges.

According to this invention, such a blanket comprises at least one bar extending over one face of the insulation blanket, from one longitudinal edge to the other thereof, as well as means for holding the said bar, and the bar bears at least one system support intended to receive a system.

In that way, the systems are borne by a bar mounted on the insulation blanket and no longer on supports themselves directly fastened onto the structure of the aircraft. If the position of the systems must be adapted during mounting, then it is not necessary to modify the structure of the aircraft at all, but only to work on the insulation blankets bearing the bars on which systems supports are mounted.

In one embodiment, it is provided that the means for holding the bar comprise loops stitched onto the corresponding face of the insulation blanket. These fastening means are easy to implement, light in weight and make it possible to ensure a satisfactory holding of the bar with regard to the blanket. Other holding means, however, may be considered. Thus one might have loops not stitched but fastened, for example, with the aid of buttons or snap fasteners. One also might have a fastening system with a self-gripping strip comprising for example tapes such as those comprising hooks and loops and known under the trade name Velcro.

To make it possible to have a better positioning of the bar on the blanket and a reinforced lateral holding, it may be provided that each bar is accommodated in a groove.

For fastening of the blanket in the aircraft, one advantageous embodiment provides that this blanket further comprises a first tape of a self-gripping strip made of two fabric tapes, one bearing hooks and the other loops, and that the first tape is fastened onto the blanket on the face opposite the face bearing the bar.

This invention also relates to an assembly comprising an insulation blanket such as described above, the said assembly being characterized in that it further comprises a fastening support for holding each of the two ends of each bar.

Such an assembly also may further comprise two frame blankets in each instance disposed along a longitudinal edge of the insulation blanket, the frame blankets comprising a notch at each fastening support.

This invention also proposes an insulation system made up of two assemblies such as defined in the preceding paragraph and characterized in that the two insulation blankets are disposed one in the extension of the other, and in that an oblong-shaped cut-out is made in the two insulation blankets, at the joining thereof. In such an insulation system according to the invention, it advantageously is provided that for each insulation blanket, a flange made of rigid synthetic material taking up the shape of the cut-out is fastened onto the corresponding blanket, and that the two flanges have reversible assembly means making it possible to connect the two flanges.

This invention further proposes an aircraft fuselage section comprising frames, an outer skin fastened onto the frames with the aid of fastening parts called stabilizers, at least one insulation blanket, characterized in that it comprises at least one assembly described above, and in that the fastening supports each are fastened onto a stabilizer.

Finally, this invention also applies to an aircraft that comprises at least one insulation blanket such as described above.

Figure 2:
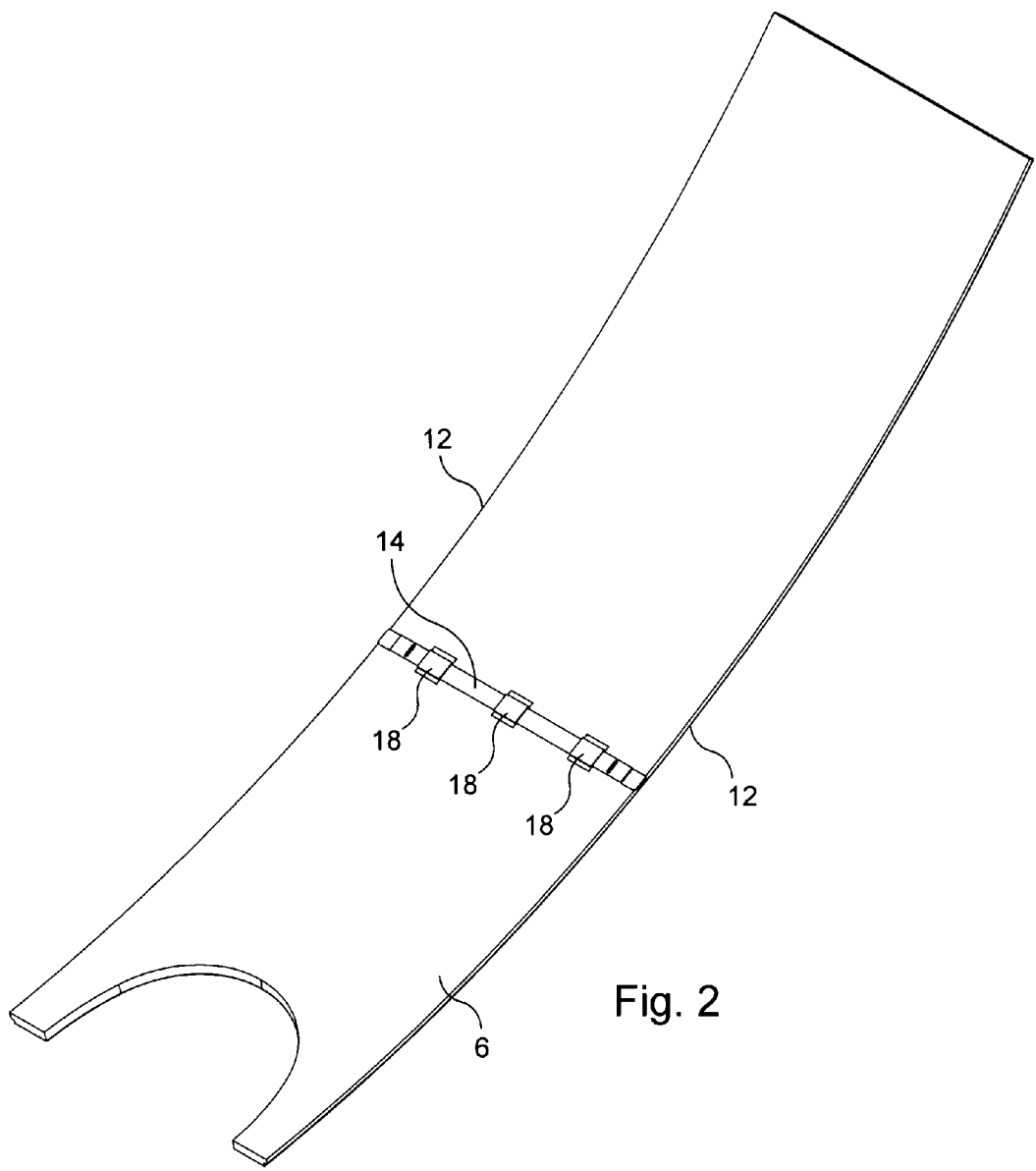
Figure 3:
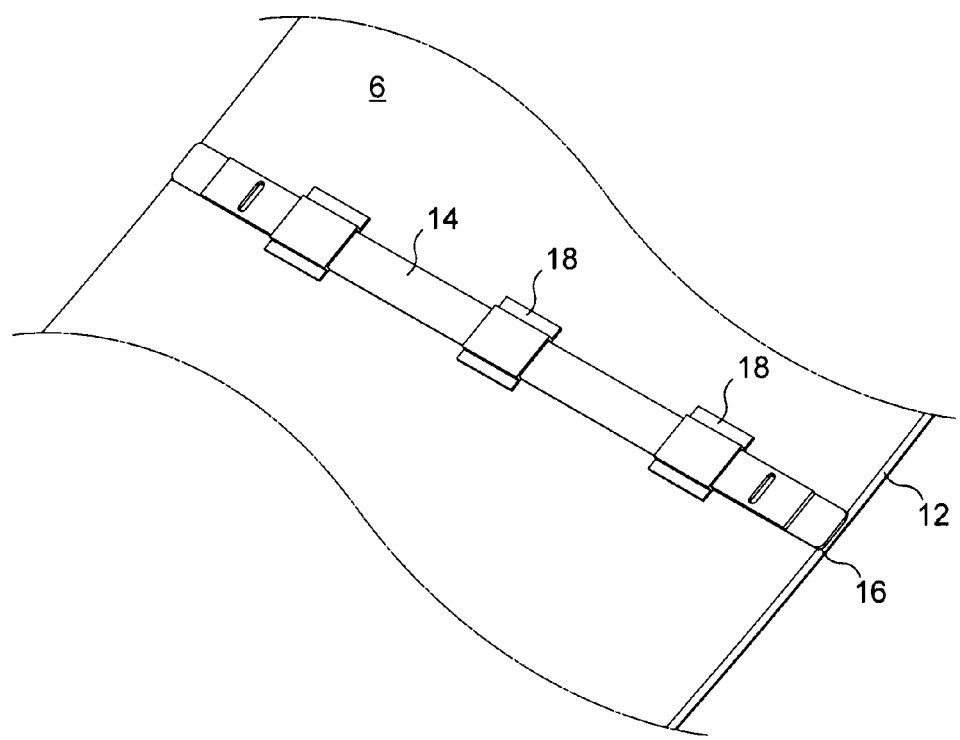
Figure 4:
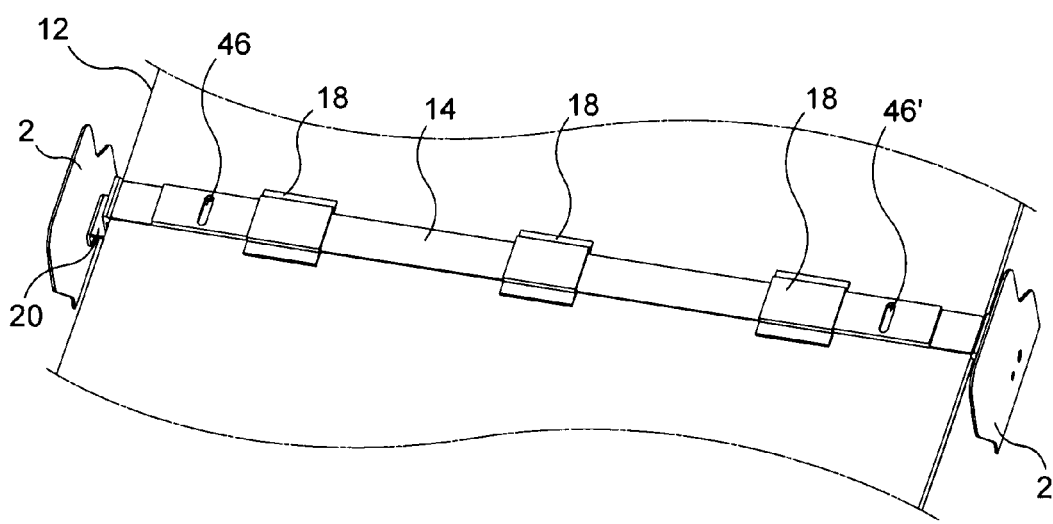
Figure 5:
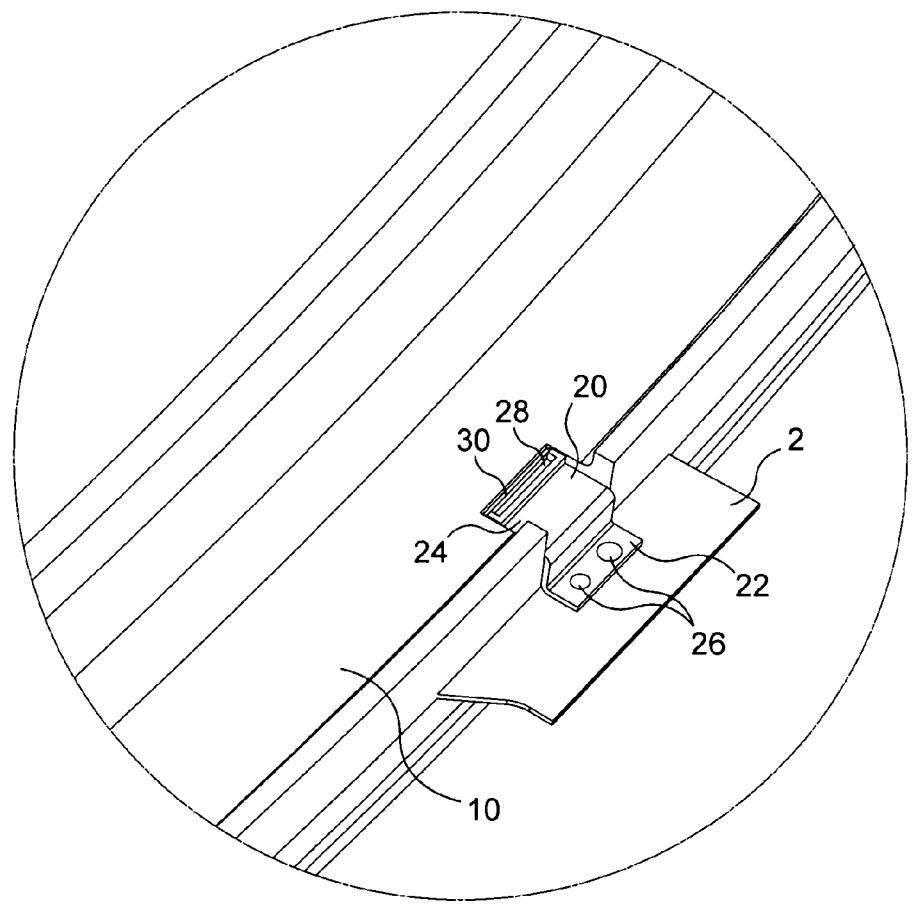
Figure 6:
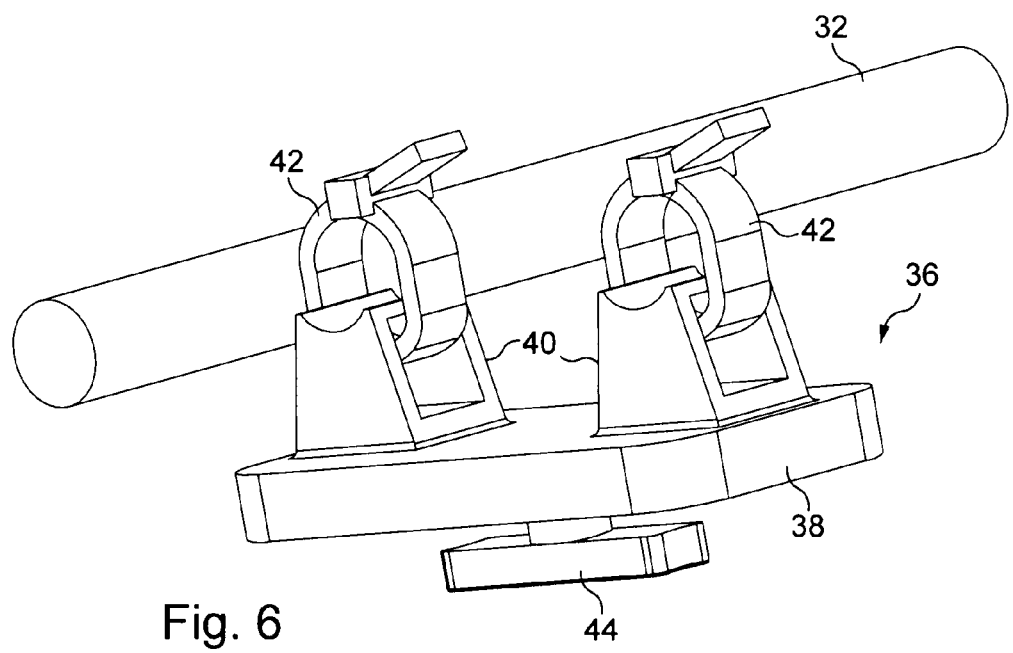
Figure 7:
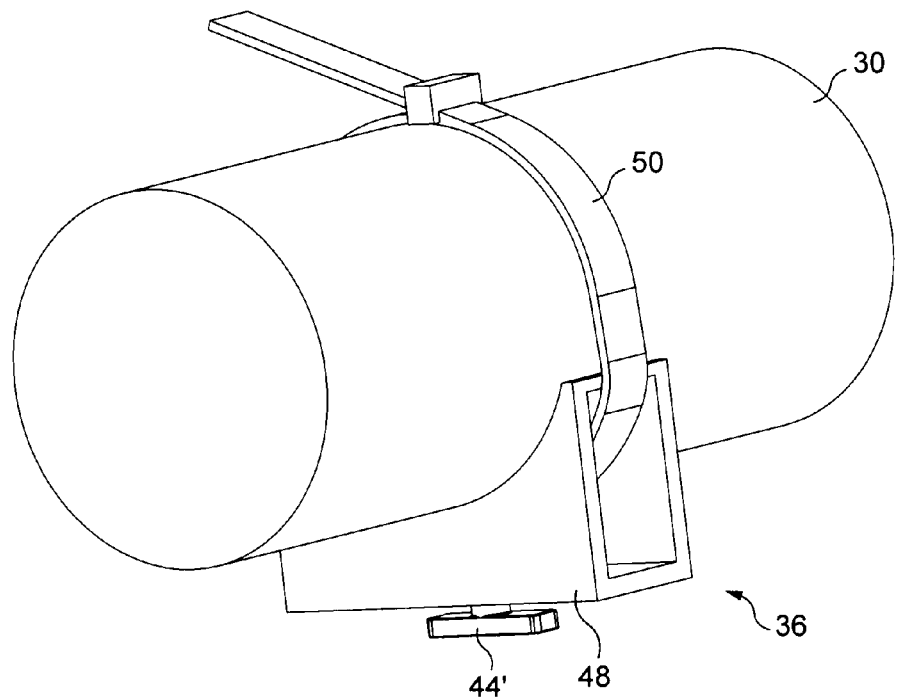
Figure 8:
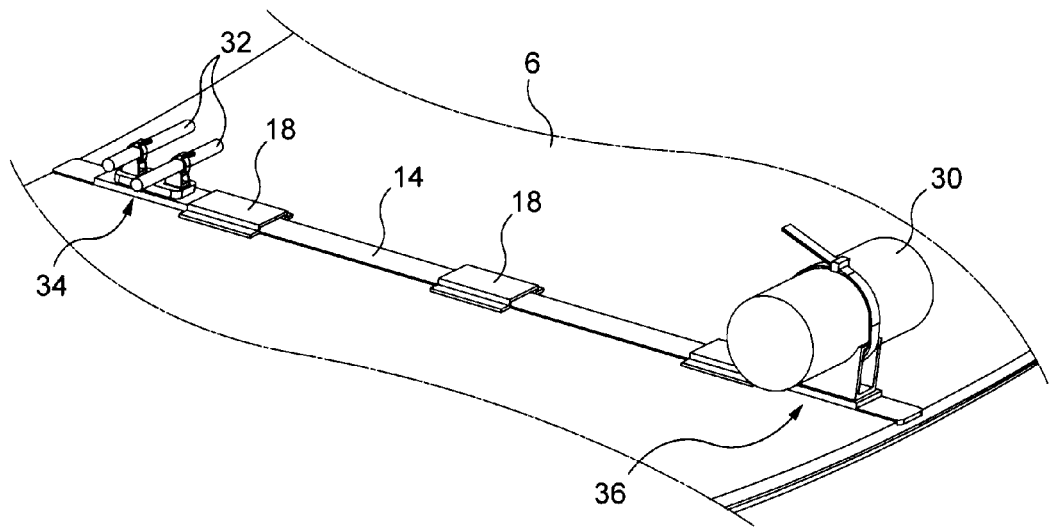
Figure 9:
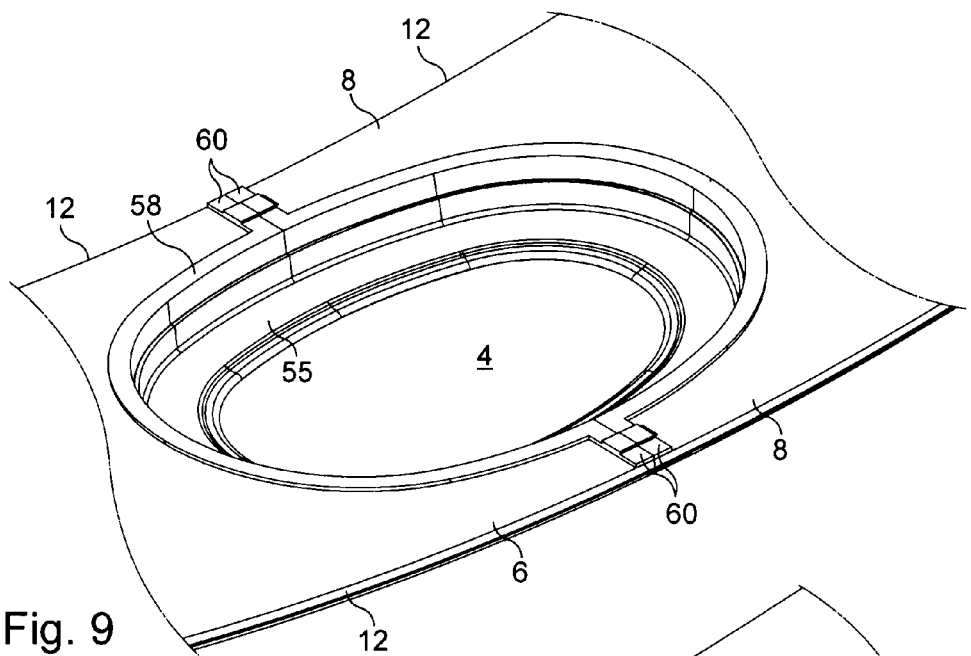
Figure 10:
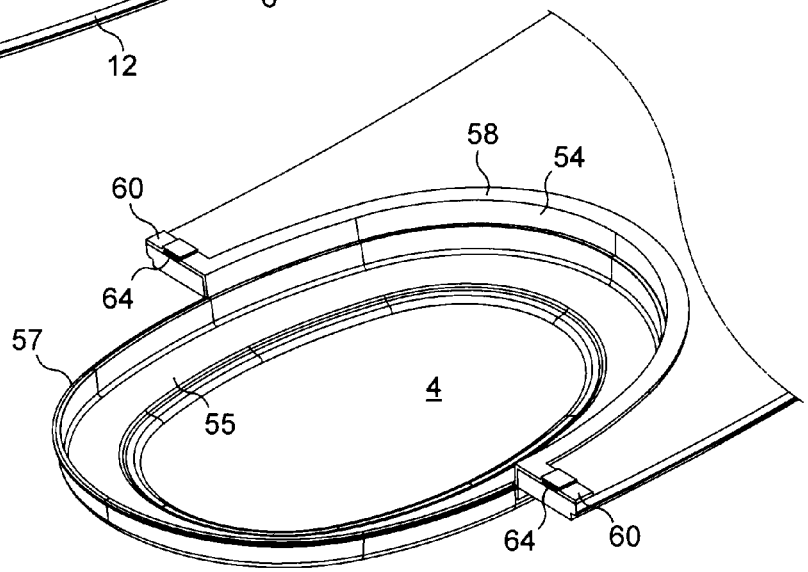
Figure 11:
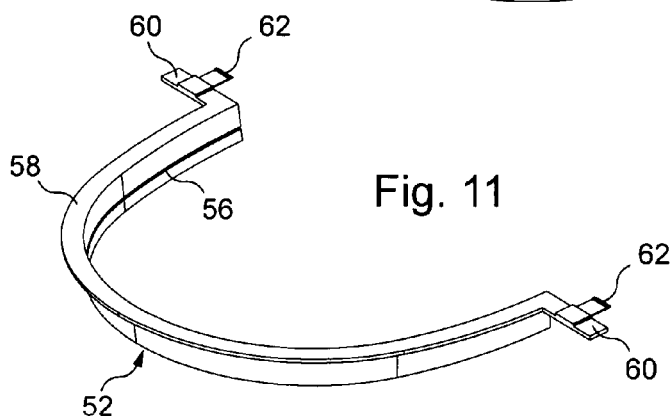

Details and advantages of this invention will become more apparent from the description that follows, presented with reference to the attached schematic drawings on which:

FIG. 1 shows an insulation blanket according to this invention mounted in an aircraft, FIG. 2 is a view in perspective, on an enlarged scale in relation to FIG. 1, of an insulation blanket from FIG. 1, FIG. 3 is a detail view from FIG. 2 on an enlarged scale, FIG. 4 shows an example of a connection of an insulation blanket according to the invention to an aircraft structure, FIG. 5 is a detail view showing a support for connection to the structure of an aircraft, FIG. 6 shows support means for electrical cables, FIG. 7 shows a support for an air pipe and a corresponding air section, FIG. 8 shows the devices from FIGS. 6 and 7 in mounted position, FIG. 9 is a detail view around an aircraft window showing how the invention applies at such a window, FIG. 10 is a view corresponding to FIG. 11, one insulation blanket having been removed, and FIG. 11 shows an insulation blanket flange that may be seen on FIG. 9.

FIG. 1 shows an aircraft fuselage portion insulated with the aid of insulation blankets. The structure of an aircraft usually comprises frames connected by stringers. An outer skin is fastened onto the frames and the stringers to form the fuselage of the aircraft. The frames are sectional parts bent so as to form a ring, more often than not a circular ring. The frames are disposed in a transverse plane in relation to the longitudinal axis of the aircraft and the stringers connect the frames by extending longitudinally in relation to the aircraft. The outer skin forming the fuselage is fastened onto the frames and the stringers with the aid of connection parts called stabilizers 2. A part of such a stabilizer may be seen, for example, on FIGS. 4 and 5.

The description that is provided below is provided with reference to a fuselage part integrating a window 4. Of course, this invention also applies to the insulation of fuselage portions not having any window, and the individual skilled in the art easily will be able to apply this invention to such a fuselage section.

Insulation blankets usually are used to achieve thermal and acoustic insulation of the aircraft. Two major families of insulation blankets are used: field blankets 6, 8 and frame blankets 10. The field blankets are insulation blankets, made of foam rubber or the like, being in the form of strips that come to be installed between two successive frames of an aircraft. As to frame blankets 10, they are used to cover the frames and form the connection between two field blankets of two adjacent fuselage sections.

On FIG. 1, there is a first field blanket 6 or lower field blanket that extends between two frames as far as halfway up window 4. As to a second field blanket 8, or upper field blanket, it extends from halfway up window 4 to the top. As explained in greater detail farther on, a cut-out is made at the joining between first field blanket 6 and second field blanket 8 in order to fit the shape of the outline of window 4.

FIG. 2 shows first field blanket 6 from FIG. 1 in perspective. It is an insulation blanket made of a foam rubber of such type as customarily used in the prior art to make aircraft field blankets. As may be seen, first field blanket 6 has an overall elongated rectangular shape. This field blanket 6 thus has two longitudinal edges 12 that correspond to the long sides of the rectangular shape of field blanket 6. The cut-out mentioned above in order to fit the shape of window 4 is made in a transverse edge corresponding to a small side of the elongated rectangular shape of field blanket 6.

According to this invention, and as may be seen on FIG. 2, first field blanket 6 bears a bar 14 on one of its faces. This bar 14 extends from one longitudinal edge 12 to the other, more or less perpendicular to its longitudinal edges. Bar 14 is made, for example, of a rigid synthetic material (as opposed to a bar that might be made of rubber).

The holding and positioning of this bar 14 is ensured on the one hand by a groove 16 and on the other hand by loops 18. Groove 16 is made at the surface of field blanket 6. The depth of groove 16 corresponds, for example, to all or part of the thickness of bar 14.

Loops 18 are implemented, for example, in fabric strips. One loop end is stitched, for example, on one side of groove 16 while its other end is stitched on the other side of groove 16. In the embodiment shown on the drawings, three loops 18 are provided. Of course, a different number of loops may be considered. For example, one might have a loop over the entire width of the blanket which then would form a sleeve for bar 14. Fastening of the loops may be accomplished by any means on the blanket. For example, buttons or snap fasteners may be used. A self-gripping strip also may be considered. Such a self-gripping strip is made of two fabric tapes. A first tape bears hooks on one of its surfaces while the other tape bears on one of the surfaces loops that grip the hooks when the said surfaces come into contact with one another. A tape (with hooks or loops) then may be fastened onto the blanket, for example by bonding or by stitching, on both sides of the position of bar 14 and tape sections (with loops or hooks) may connect the tapes fastened onto the blanket, thus forming detachable loops. Fastening a tape (or tape sections) of one type (with hooks or with loops) onto one face of bar 14 and of another type (with loops or with hooks) onto the insulation blanket, at the location provided for accommodating bar 14 also may be considered.

Fastening of field blanket 6 is accomplished, for example, with the aid of self-gripping strips (better known under the name of Velcro—trade name—strips). One fabric tape of the self-gripping strip is bonded onto the outer skin forming the fuselage of the aircraft, while the other tape making up the self-gripping strip is fastened, for example by bonding, onto first field blanket 6. The tapes of the self-gripping strip are not shown on the drawings. The tape of the self-gripping strip bonded onto field blanket 6 is bonded onto the face of this blanket opposite the face of field blanket 6 bearing bar 14.

Bar 14 is connected to the structure of the aircraft through two fastening supports 20. Each fastening support comes in the form of a Z-shaped part. Each fastening support 20 has a fastening foot 22, a head 24 and a connecting body connecting fastening foot 2 to head 24.

Fastening foot 22 comes in the form of a plate having two bores 26 of different diameters. In this way, a fastening support 20 may be fastened onto a stabilizer 2 having corresponding bores in only one way. During a possible dismantling, there then is no risk of reversing two fastening supports mounted on the same stabilizer.

Head 24 of fastening support 20 also comes in the form of a plate. The latter is parallel to fastening foot 22 and has a groove forming a housing 28 the size of which is adapted to that of one end of bar 14. In this way, as illustrated on FIG. 4, each end of bar 14 comes to be positioned in a housing 28 of a fastening support 20. In order to facilitate insertion of the end of bar 14 into housing 28, it may be provided that head 24 has a beveled upper edge 30 (FIG. 5).

Bar 14, besides its function of holding the field blanket on which it is located, also has a function of supporting systems such as, for example, air pipes 30 or electrical cables 32.

FIG. 6 shows a cable support 34 intended to receive two electrical cables 32 while FIG. 7 shows a pipe support 36 intended to receive an air pipe 30.

Cable support 34 has a base 38 on which two mini-bases 40 are disposed, each intended to receive an electrical cable 32. Each mini-base 40 has an upper surface adapted to the peripheral surface of an electrical cable and has a through-hole allowing passage of an elastic collar 42 collar so as to enable clamping of an electrical cable 32 installed on the upper surface of mini-base 40. On the side opposite mini-bases 40, base 38 bears a tenon 44 of elongated shape. As to bar 14, it has an oblong hole 46 adapted for accommodating tenon 44 of cable support 34. Fastening of cable support 34 onto bar 14 then is accomplished by a quarter turn. A stop/locking system enabling locking of cable support 34 in a given position on bar 14 may be provided in bar 14.

Pipe support 36 (FIG. 7) comprises a base 48, the upper face of which is adapted to the outer peripheral surface of an air pipe 30 and also has a through-hole allowing passage of a collar 50 making it possible to hold an air pipe 30 installed on the upper face of base 48. Pipe support 36 also has a tenon 44' intended to cooperate with an oblong hole 46' of bar 14 so as to allow a quarter-turn mounting of pipe support 36 on bar 14.

FIGS. 9 to 11 illustrate how it also is possible to hold a field blanket around a window 4 when an insulation blanket according to this invention is used. A window frame 55 usually comes to surround window 4. It is proposed here to implement a manacle ring around window frame 55 to hold field blankets 6 and 8 around the window. This manacle ring is made in two parts, a male part 52 and a female part 54. Each of these two parts comes to follow the shape of window frame 55 over half of its periphery. A shoulder 56 makes it possible to implement attachment of each of these two parts onto window frame 55 which comes to cooperate with an outer bead 57 located at the periphery of window frame 55. Each of the two parts has a flange 58 that extends moving away from window 4 and so as to come to cover corresponding field blanket 6, 8.

At the joining between male part 52 and female part 54, flange 58 in each instance extends radially moving away from window 4 and thus forming connecting tabs 60. Connecting tabs 60 of male part 52 each bear a toothed tongue piece 62 while as to connecting tabs 60 of female part 54, they bear a corresponding housing 64 making it possible to accommodate a tongue piece 62 in each instance, the toothed end of the tongue piece being able to go right through housing 64 and come to be grasped, thus forming a ratchet mechanism. In that way, a field blanket is held to the structure of the aircraft by self-gripping strips, through fastening support 20 holding a bar 14 and by the manacle ring implemented around a window frame 55.

Mounting of field blankets, but also of frame blankets, as well as systems is easy by virtue of this invention. By virtue of the presence of self-gripping strips, the blanket may be positioned and "pre-held" on the fuselage of the aircraft. By virtue of the flexibility of bars 14 made of synthetic material, the ends thereof come to be ratcheted into their housing 28 provided for this purpose in head 24 of fastening supports 20. The systems come to be fastened onto bars 14. In this way, it is not necessary to provide multiple holes in the structure and/or the insulation blankets.

In the above description, as will be directly apparent to the individual skilled in the art, holes are provided only in certain stabilizers connecting the outer skin of the fuselage to the frames of the structure. On the blanket side, it seems inevitable to make a cut-out around the windows as relates to the field blankets. No other specific cut-out has to be made in these field blankets. The grooves made therein for accommodating the bars are optional. Moreover, the grooves are made in advance and are not made on the spot during mounting of the field blanket in the aircraft.

As may be seen on FIG. 5, it is advisable to provide cut-outs at the fastening supports in frame blankets 10. The number of cut-outs here is very limited. When the corresponding aircraft is being serviced, dismantling and remounting of the insulation panels is very easy with a system according to this invention. No specific tool is necessary at the time of initial mounting or for servicing.

Of course, this invention is not limited to the embodiment described above by way of non-limitative example. It also relates to all the embodiments variants within the capacity of the individual skilled in the art in the context of the claims below.

The invention claimed is:

1. An insulation blanket for an aircraft, comprising:
   an elongate strip of insulation material having two substantially parallel longitudinal edges, including a first longitudinal edge and a second longitudinal edge;
   at least one bar extending over a first face of the elongate strip of insulation material, from the first longitudinal edge to the second longitudinal edge such that a first end of the bar extends past the first longitudinal edge and a second end of the bar opposite the first end extends past the second longitudinal edge; and
   at least one holder configured to hold the bar, the at least one holder being fixed to the elongate strip of insulation material,
   wherein the bar is configured to bear at least one system support that is configured to receive a system,
   wherein the elongate strip of insulation material includes at least one groove running horizontally from the first longitudinal edge to the second longitudinal edge, wherein each said at least one bar has a width that is substantially the same as a width of said at least one groove and is accommodated in a corresponding one of said at least one groove, wherein each said at least one bar has a thickness that is the same as or greater than a depth of the corresponding one of said at least one groove, and wherein the at least one holder connects to the elongate strip of insulation at portions of the elongate strip of insulation adjacent to said at least one groove on opposite sides thereof.

2. The insulation blanket according to claim 1, wherein the at least one holder includes a plurality of loops stitched onto the first face of the elongate strip of insulation material.

3. The insulation blanket according to claim 1, further comprising a first tape of a self-gripping strip made up of two fabric tapes, one bearing hooks and another bearing loops, wherein said first tape is fastened onto the elongate strip of insulation material on a second face thereof opposite the first face.

4. An aircraft comprising at least one insulation blanket according to any one of claims 1, 2, or 3.

5. An assembly comprising the insulation blanket according to claim 1, wherein the assembly further comprises a plurality of fastening supports, each said fastening support being configured to hold an end of said bar.

6. The assembly according to claim 5, further comprising two frame blankets disposed along respective first and second longitudinal edges of the elongate strip of insulation material, wherein each said frame blanket includes a notch at each fastening support.

7. An insulation system made up of two assemblies according to claim 5, each said assembly including one of said insulation blankets, where said insulation blankets of the two assemblies are disposed one in extension of the other, and each of which includes an oblong-shaped cut-out for the elongate strip of insulation material at a joining portion of said insulation blankets of the two assemblies.

8. An aircraft fuselage section, comprising frames and an outer skin fastened onto the frames with the aid of stabilizer fastening parts, comprising at least one assembly according to claim 5, wherein the fastening supports each are fastened onto a corresponding stabilizer.

9. The insulation system according to claim 7, wherein, for each of said insulation blankets of the two assemblies, a flange of rigid synthetic material taking up the shape of the cut-out is fastened onto the blanket, and the two flanges have reversible connectors configured to connect the two flanges.

10. The insulation system according to claim 7, wherein the at least one holder is comprised of a different material than a material of which the at least one bar is comprised.

11. The insulation system according to claim 7, wherein the elongate strip of insulation material includes a plurality of said grooves and said bars accommodated in corresponding ones of said grooves, each said groove running horizontally from the first longitudinal edge to the second longitudinal edge, and the plurality of said grooves being separated from one another vertically.

12. The insulation blanket according to claim 1, wherein the at least one holder includes a single loop stitched onto the first face of the elongate strip of insulation material that runs horizontally from the first longitudinal edge to the second longitudinal edge so as to form a sleeve to hold the bar.

13. The insulation blanket according to claim 1, wherein the at least one bar is a non-square rectangle in front view and the thickness of the at least one bar is less than the width and a length thereof.

* * * * *